United States Patent [19]
Pfeifer

[11] Patent Number: 5,666,407
[45] Date of Patent: Sep. 9, 1997

[54] SOFTWARE-BASED BRIDGING SYSTEM FOR FULL DUPLEX AUDIO TELEPHONE CONFERENCING

[75] Inventor: Randy D. Pfeifer, Warrenville, Ill.

[73] Assignee: NCR Corporation, Dayton, Ohio

[21] Appl. No.: 567,521

[22] Filed: Dec. 5, 1995

[51] Int. Cl.$^6$ .............................. H04M 9/08; H04M 3/56
[52] U.S. Cl. ........................ 379/406; 379/202; 379/206; 379/388; 370/268
[58] Field of Search ...................................... 379/406, 388, 379/389, 390, 410, 420, 387, 202, 204, 205, 206; 370/260, 261, 266, 267, 268, 269, 285, 286, 292; 348/15

[56] References Cited

U.S. PATENT DOCUMENTS

| | | | |
|---|---|---|---|
| 4,139,731 | 2/1979 | Hashemi et al. | 379/406 X |
| 4,289,932 | 9/1981 | Reed | 370/268 |
| 4,635,252 | 1/1987 | Kuchler | 379/202 X |
| 5,054,021 | 10/1991 | Epps | 370/268 |
| 5,363,441 | 11/1994 | Feiner et al. | 379/202 X |
| 5,404,397 | 4/1995 | Janse et al. | 379/406 X |
| 5,434,912 | 7/1995 | Boyer et al. | 379/406 X |
| 5,533,112 | 7/1996 | Danneels | 379/390 X |

Primary Examiner—Krista M. Zele
Assistant Examiner—Devenda T. Kumar
Attorney, Agent, or Firm—Michael A. Kaufman

[57] ABSTRACT

A software-implemented bridging routine is provided for a full duplex audio telephone system comprising units A, B and C, of which only unit A need have at least two lines and be full duplex. Unit A receives and speaker-reproduces an audio signal B+C that echoes with a time delay $dt_1$ and is detected by unit A's microphone as a signal $k_bBdt_1+k_cCdt_1$, where $k_b$ and $k_c$ are co-efficients. Unit A's host software determines time $dt_1$ and generates a delay $dt_2 \approx dt_1$. Unit A's host processor sums its own microphone output with a signal generated by a non-destination unit that is delayed by time $dt_2$. Thus, when communicating with unit B, unit A's software generates a host processor output signal $A+k_bBdt_1+k_cCdt_1+Cdt_2$. The $k_bBdt_1$ echo component is removed by unit A's AEC, which is coupled between units A and B. This causes unit B to receive the signal $A+Cdt_2+k_cCdt_1$ from unit A. Since $dt_2 \approx dt_1$, user B hears voice A summed with a slightly delayed voice C (e.g., $Cdt_2$) superimposed with an attenuated in-phase version of voice C (e.g., $k_cCdt_1$). User B thus hears user A's voice and user C's voice conversing naturally in a full duplex manner. Similarly, B hears user A and user C conversing, and user C hears user A and user B conversing. In this fashion, full-duplex operation is achieved without using hardware bridge circuitry.

17 Claims, 3 Drawing Sheets

SOFTWARE-BASED BRIDGING SYSTEM FOR FULL DUPLEX AUDIO TELEPHONE CONFERENCING

FIELD OF THE INVENTION

The present invention relates generally to telephone communications, and more particularly to telephone systems that permit full duplex audio conferencing among multiple parties.

BACKGROUND OF THE INVENTION

Telephones are commonly found in homes and in businesses. Such telephones may be combined in a full duplex telephone system, such as shown in FIG. 1, in which various users at different telephones (e.g., users A, B, C) can hear each other and speak to each other simultaneously.

In the configuration of FIG. 1, user A is a full duplex unit 20A coupled by two cables, 30AB/BA and 30AC/CA, to two units, namely units 20B and 20C, which are associated with users B and C respectively. By contrast, units 20B and 20C are each shown coupled by a single cable (e.g, 30AB/BA, 30AC/CA) to only one unit, namely unit 20A associated with user A. Units 20A, 20B, 20C communicate with each other through an analog or digital phone network 40, and hardware-implemented bridge circuitry 50. Bridge circuitry 50 enables each user to speak with and listen to each other user. Thus, user B can communicate with user C, notwithstanding that user B and user C are connected to user A. The "AB/BA" and "AC/CA" nomenclature associated with the telephone cables denotes their multi-directional nature, and indeed each telephone cable includes several wires.

Thus, although unit 20A must be a full duplex two line unit, unit 20B and unit 20C may be single line non-full duplex units, as shown. As such, unit 20A will include a two line personal computer ("PC")/speaker phone and full duplex modules. As used herein, "PC/speaker phone" may include a telephone, a speaker telephone, a PC coupled to a telephone, and a PC coupled to a speaker telephone.

Although unit 20B and/or unit 20C may be equipped similarly to unit 20A, it suffices if unit 20B and/or unit 20C are ordinary single line, telephone units. Unit 20A (which may, but need not be identical to units 20B and/or 20C) includes a host computer system 60 comprising a central processor unit ("CPU") 70, and memory 80. One or more software programs 90 may be stored or loaded into memory 80 for execution by CPU 70.

Unit 20A includes a first module 100AB associated with cable 30AB/BA coupling units 20A and 20B, and further includes a second module 100AC associated with cable 30AC/CA coupling units 20A and 20C. Of course, if unit 20A were coupled to additional units, there would be additional cables and modules. Each module 100AB, 100AC preferably includes a modem (e.g., 110AB, 110AC), a speaker phone unit (e.g., 120AB, 120AC), and an acoustic echo canceller ("AEC") unit (e.g., 130AB, 130AC).

Modem 110AB couples speaker phone 120AB to telephone cable 30AB/BA, while modem 110AC couples speaker phone 120AC to telephone cable 30AC/CA. The speaker phone provides the functions of dialing, and includes a sound system 140, a loudspeaker 150, and a microphone 160.

It is the function of the AEC units to prevent a target user from hearing his or her own echo emanating from a sending unit. Thus, AEC 130AB will prevent user B from hearing an echo of his or her own voice on the signal received from unit 20A. AEC functions may be carried out for convenience in the associated modems within each speaker/telephone.

Sound system 140 interfaces signals from host computer unit 60 to loudspeaker 150 and microphone 160. Loudspeaker 150 reproduces sounds generated by units 20B and 20C, while microphone 160 picks up the voice of user A as well as other audible sounds within the environment of unit 20A. Unfortunately, such other audible sounds can include echoes of signals from user B and user C. These echoes can result from soundwaves emanating from speaker 150 bouncing off walls and other objects within the room or environment containing unit 20A. In similar fashion, microphones associated with units 20B, 20C may detect and couple into their respective units echoes of signals from users A and C, or from users A and B.

It is the function of bridge unit 50 to enable each user to hear all parts of a conversation. Thus, user A can hear user B and/or user C, B can hear user A and/or user C, and user C can hear user A and/or user B. As noted, user B and user C may communicate with each other and with user A, notwithstanding that only unit 20A is required to be a full duplex two line unit. Bridge unit 50 is commonly implemented in hardware and operated under control of host computer system 60 as shown by control line 170.

Somewhere within system 10 physical space must be provided to mount the circuitry implementing bridging unit 50. In some systems, bridging circuitry is implemented on a common printed circuit board as a modem, perhaps modem 110AB. But the resultant printed circuit board then becomes a customized rather than a generic commodity, with resultant increased manufacturing cost.

The precise location of bridging unit 50 can affect hardwiring with the various telephone cables 30AB/BA, 30AC/CA. Frequently the circuitry implementing unit 50 is complex, especially if telephone network 40 is digital rather than analog. A digital network requires that bridging circuitry 50 accommodate and understand the protocol of the various digital signals. Further, the bridging circuitry must also identify the source of each user's voice and must sum these voices mathematically in the digital realm. While the cost of analog or digital bridging circuitry is perhaps $30 or less, it would be desirable to eliminate the cost altogether. Understandably, it would be advantageous to eliminate the requirement to provide physical space somewhere within system 10 to locate bridging unit 50.

Thus, there is a need for a bridging system for use in a full duplex telephone system that does not require hardware implementation. Preferably such a bridging system should be implemented in an inexpensive fashion, using conventional components and techniques.

The present invention discloses such a bridging system for use in a full duplex telephone system.

SUMMARY OF THE INVENTION

The present invention provides a software-implemented bridge function that replaces the hardware-implemented bridge circuit unit found in prior art audio telephone conferencing systems. The software-implemented program preferably is stored in memory within the host processor associated with a PC/speaker phone system, for execution by the associated CPU. Each PC/speaker phone system includes a module comprising an acoustic echo canceller ("AEC") to ensure that a user does not hear his or her own echo, a modem, and a speaker phone.

In a duplex system comprising PC/speaker phone units A, B and C, unit A can receive an audio signal B+C representing unit-B generated audio plus unit C-generated audio. This B+C signal emanates from unit A's loudspeaker and typically echoes from the walls in the environment containing unit A. After an acoustic path time delay $dt_1$, unit A's microphone picks up the echo as a signal $k_bBdt_1+k_cCdt_1$, where $k_b \approx k_c$ represents an amplitude attenuation co-efficient. In similar fashion, the microphones associated with units B and C output corresponding signals.

Host software associated with unit A determines the acoustic time delay $dt_1$ associated with the environment of unit A. The host software preferably generates an audible test tone through unit A's loudspeaker, which tone echoes within the local environment and is detected by unit A's microphone. Comparing the return echo to the emanated test tone provides a measure of $dt_1$. Alternatively, since unit A host software has available signals B and C, as well as the echo signal $k_bBdt_1+k_cCdt_1$, these signals can be compared to determine $dt_1$.

Unit A's host software sums its own microphone output signal with a version of the signal generated by a non-destination unit by a time delay $dt_2 \approx dt_1$, to form a host processor output signal. Thus, when communicating with unit B (e.g., unit B is the destination unit), unit A's software generates a host processor output signal $A+k_bBdt_1+k_cCdt_1+Cdt_2$. When communicating with unit C, unit A generates a host processor output signal $A+k_bBdt_1+k_cCdt_1+Bdt_2$. (In similar fashion, unit B and unit C may also generate similar host processor output signals, as appropriate.)

In the module coupled between unit A and unit B, the $k_bBdt_1$ echo component of the host processor signal is removed by unit A's AEC 130. Thus, unit A sends to unit B a module output signal $A+Cdt_2+k_cCdt_1$, and unit A sends to unit C a module output signal $A+Bdt_2+k_bBdt_1$. (In similar fashion, units B and C may also generate module output signals to unit A, as appropriate.)

The audio heard by user B is $A+Cdt_2+k_cCdt_1$. Because $dt_2 \approx dt_1$, user B hears voice A summed with a slightly delayed voice C (e.g., $Cdt_2$) upon which is superimposed an attenuated in-phase version of voice C (e.g., $k_cCdt_1$). Thus, user B hears the voice of user A and the voice of user C, conversing naturally in a full duplex manner. Similarly, user B hears user A and user C conversing, and user C hears user A and user B conversing. In this fashion, full-duplex operation is achieved without using hardware bridge circuitry.

Other features and advantages of the invention will appear from the following description in which the preferred embodiments have been set forth in detail in conjunction with the accompanying drawings.

DESCRIPTION OF THE PREFERRED EMBODIMENTS

Figure 1:
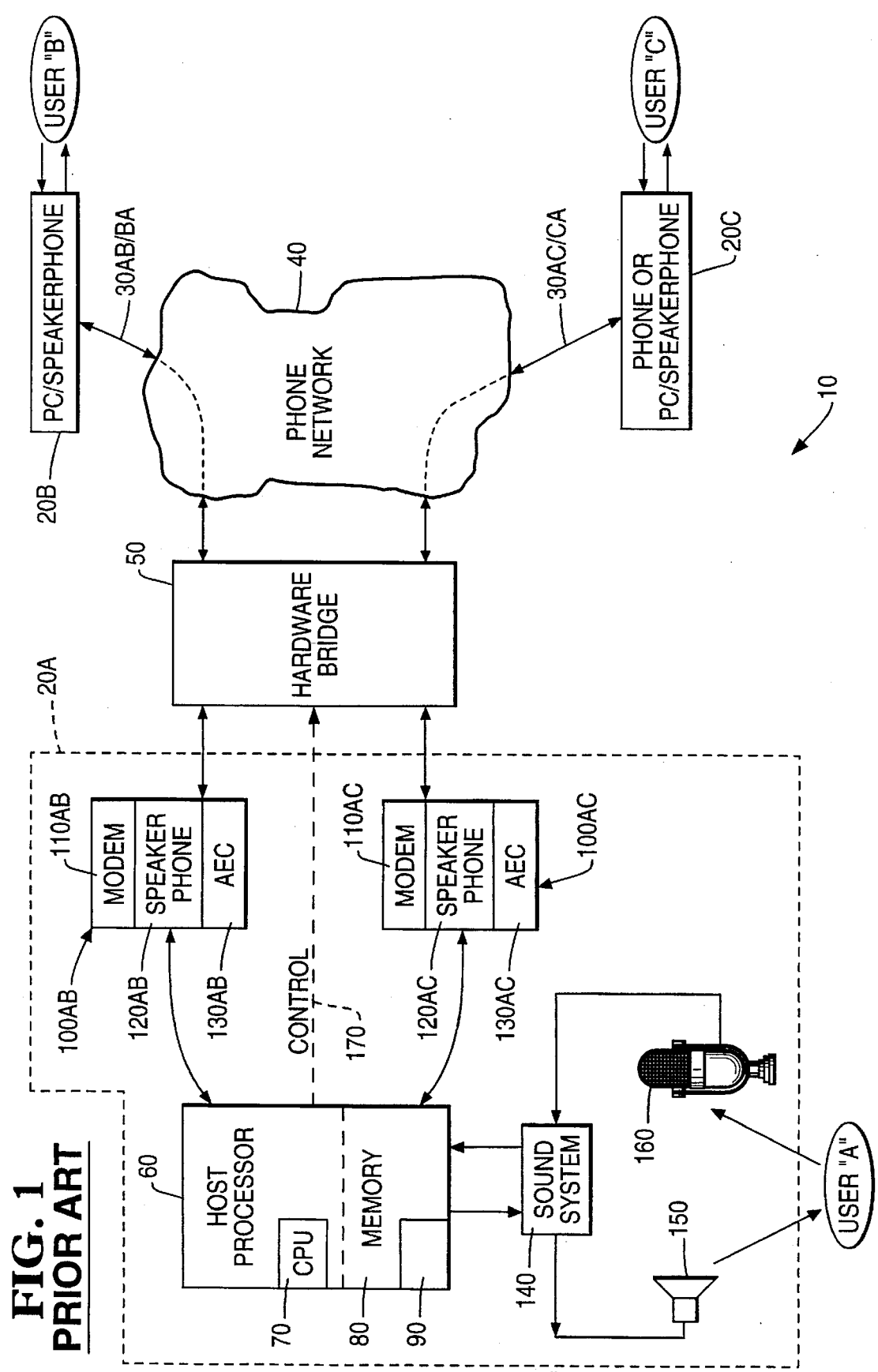
FIG. 1 is a block diagram of a generalized two-line full duplex system employing hardware-implemented bridging circuitry, according to the prior art.
Figure 2:
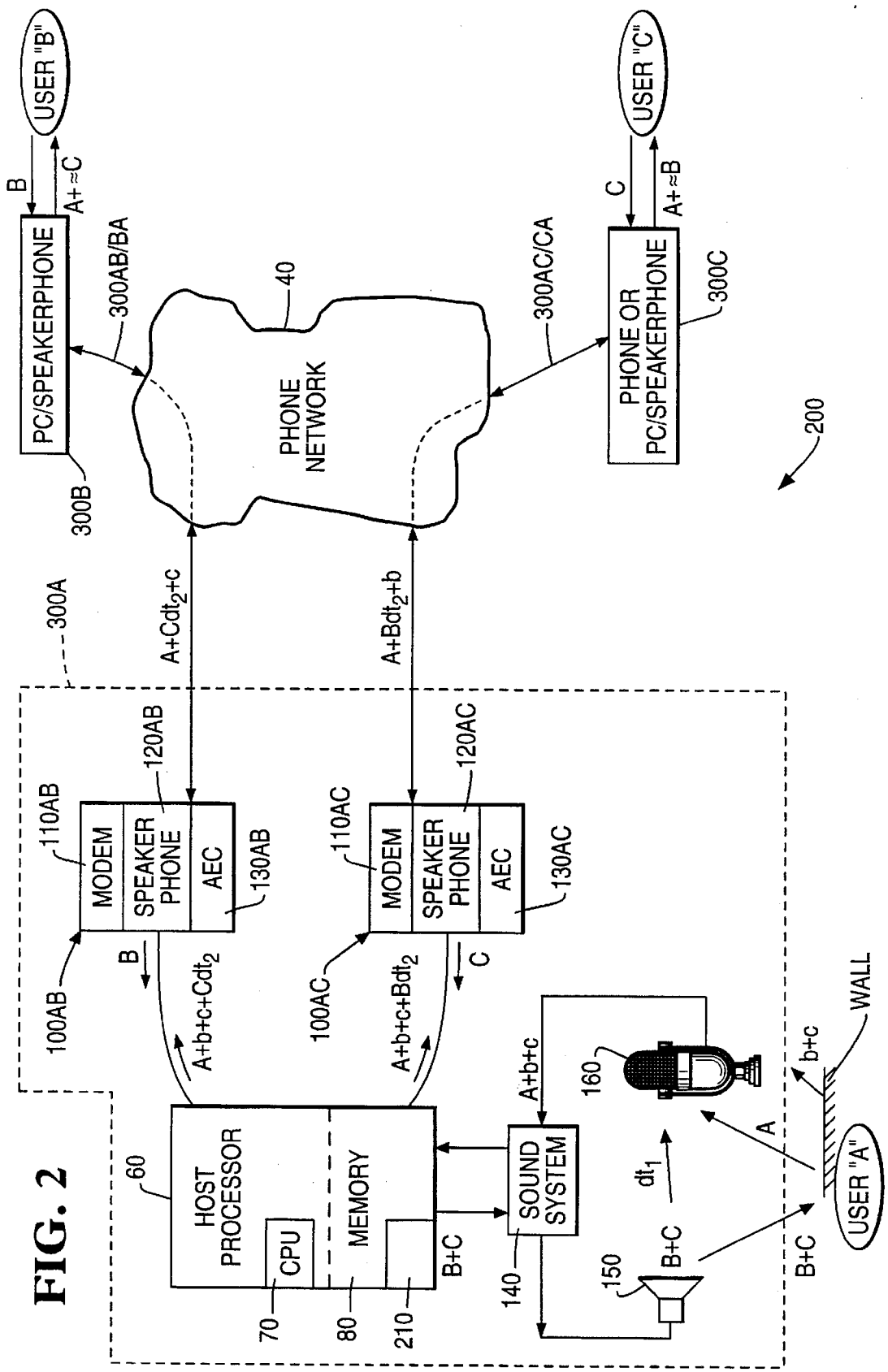
FIG. 2 depicts a generalized two-line full duplex system coupling together users A, B and C, using a software-implemented bridge function according to the present invention.

FIG. 2 is a block diagram of a generalized two-line full duplex system 200 coupling together users A, B and C, using software-implemented bridging 210, according to the present invention. In some aspects, system 200 resembles the prior art system shown in FIG. 1. For example, system 200 includes personal computer ("PC")/speaker phone two line full duplex unit 300A associated with unit A, and units 300B and 300C associated with respective users B and C. As noted, there is no requirement that either of unit 300B or unit 300C have two line, full duplex capability. Thus, unit 300B and/or 300C may be single line non-duplex common telephone units, but may instead be similar to unit 300A.

The various units 300A, 300B, 300C communicate with each other through an analog or digital phone network 40 using telephone cables 300AB/BA and 300AC/CA, which carry signals bi-directionally. According to the present invention, unit 300A, as well as Units 300B and 300C, may be a generic off-the-shelf commodity unit that does not include any provision for bridging.

In stark contrast to what was shown in FIG. 1, system 200 does not include a hardware-implemented bridge circuit. As will be described, host software stored in memory 80 in unit 300A's host computer system 60 includes a routine 210 that implements a bridging function in software. According to the present invention, the software-implemented bridging function does not require additional hardware or dedicated components beyond what would already be present in system 200.

Unit 300A is a two-line full duplex unit, and is coupled with cable 300AB/BA to 300B (e.g., user A to user B), and is coupled with cable 300AC/CA to unit 300C (e.g., user A to user C). Unit 300A may include a host computer unit 60 that has a CPU 70 and memory 80, in which is stored (or loaded), a software routine 210 implementing the present invention. As noted, units 300B and 300C may be similar to unit 300A in function, but need not be, and may in fact be single line non-duplex telephone units.

Similar to what was described in FIG. 1, associated with the first unit 300A is a first module 100AB that includes modem 110AB, speaker phone 120AB, and AEC unit 130AB, and a second module 100AC with modem 110AC, speaker phone 120AC, and AEC 130AC. Each AEC unit ensures that a user does not hear his or her own echo. In FIG. 2, if unit 300A were coupled to N units rather than to only two units (e.g., to units 300B and 300C), unit 300A would include N modules such as modules 100AB or 100AC. In FIG. 2, unit 300A further includes a sound system 140, a loudspeaker 150, and a microphone 160.

The system shown in FIG. 2 will now be described from the perspective of the audio received by user B from unit 300B. The operation is symmetrical, however, and the description could instead refer to the audio received by user A or by user C.

Assume that users A, B and C are each speaking. At unit 300A, host software 210 sums the audio from the remote end point(s) of the other units. Thus for unit 300A incoming audio is summed from units B and C, and the resultant signal (denoted B+C) is output through unit A's loudspeaker 150. At unit 300B, user B would hear a signal A+C, and at unit 300C, user C would hear a signal A+B. Since there is no requirement that either unit 300B or 300C be similar to unit 300A, users B and C may hear the respective signals through a telephone earphone, rather than a loudspeaker.

As shown in FIG. 2, unit 300A includes a loudspeaker, and an acoustic echo of audio received from unit 300A from units 300B and 300C may be present. Thus, as depicted in FIG. 2, B+C audio emanating from unit A's speaker may echo off the walls in the environment containing unit A. These echoes will be detected by unit A's microphone 160, which also detects sounds spoken by user A.

Relative to unit 300A, the echo "b" from B is heard by microphone 160 (and by user A) after an acoustic path time delay $dt_1$, where $b=k_bBdt_1$ ($k_b$ being an amplitude co-efficient, usually less than unity). Similarly, the echo from C is heard after delay $dt_c$ and is denoted "c", where $c=k_cCdt_1$ and where $k_c$ is an amplitude co-efficient. Because frequencies associated with signals A and B might be different, $k_a$ may differ from $k_b$. Thus, user A's microphone detects and inputs into unit 300A's sound system 140 a signal A+b+c. Similarly, if units 300B and 300C include speaker telephones, user B's microphone will input into unit 300B's sound system a signal B+a+c, and unit 300C's microphone will input into its sound system a signal a+b+C.

If units 300B and 300C were similar in function to unit 300A, it is noted that because unit 300A's environment may be different from that associated with unit 300B or unit 300C, the time delay $dt_1$ associated with each unit may be different. For example, if echo-producing office walls surrounding unit 300B were far removed from that unit's loudspeaker relative to walls surrounding unit 300A, $dt_1$ for unit 300A would be less than the associated delay for unit 300B.

Host computer unit 60 associated with unit 300A can readily calculate the $dt_1$ for that unit by executing, for example, a portion of software 210. A subroutine within software 210 can cause speaker 150 to emit an audible test tone that echoes from unit 300A's environment, is detected by microphone 160, and the return echo signal coupled through sound system 140 and into the host computer unit 60. By comparing the onset of the emitted test tone against the onset of the return echo signal, software routine 210 can ascertain $dt_1$.

Alternatively, $dt_1$ may be detected in the following manner. As shown in FIG. 2, host computer unit 60 is provided with the user A microphone output A+b+c, as well as with a faithful representation of original incoming audio B and incoming audio C. Thus, unit 60 can compare arrival of the original incoming signal B with arrival of the echo b, or arrival of signal B with echo b to determine the Unit 300A's time delay $dt_1$.

Software routines for determining $dt_1$ using either described procedure, or indeed other procedures, are known in the art and will not be described herein. If units 300B, 300C are similar to unit 300A, their own host computer systems will calculate their own acoustic path delay times. As noted, delay time $dt_{1A}$ for unit 300A need not equal delay time $dt_{1B}$ for unit 300B, or delay time $dt_{1C_C}$ for unit 300C.

Using unit A (300A) as an example, knowing its acoustic delay time $dt_{1A}$, host processor software 210 then generates a time delay $dt_{2A}$ that is substantially equal to $dt_{1A}$. By "substantially equal" it is meant that $dt_{2A}$ should be equal to $dt_{1A}$ within a tolerance not exceeding about ±10 ms.

Unit 300A's host software 210 then sums the input from its own microphone (e.g., signal A+b+c) with a $dt_{2A}$-delayed version of signal C, to form a host processor output signal A+b+c+$Cdt_{2A}$ to be sent to unit 300B. Unit 300A's host software 210 further sums its own microphone input with a $dt_{2A}$-delayed version of signal B, to form a host processor output signal A+b+C+$Bdt_{2A}$ to be sent to unit 300C.

The "b" portion of the A+b+c+$Cdt_2$ signal is removed by unit 300A's AEC 130AB, which is coupled between unit 300A and unit 300B. Thus, AEC 130AB prevents user B from hearing his or her own echo b. As a result, unit 300A's module 110AB sends to unit 300B the module output signal A+$Cdt_2$+c, which is to say A+$Cdt_2$+$k_cCdt_{1A}$. Similarly, the "c" portion of the A+b+c+$Bdt_2$ signal is removed by unit 300A's AEC 130 AC, which is coupled between unit 300A and unit 300C.

Thus, unit 300A sends to unit 300C the signal A+$Bdt_2$+b, which is $Bdt_2$+$k_bBdt_{1A}$. If units 300B and 300C were identical in function to unit 300A, they could in similar fashion communicate signals to unit 300A.

Because $dt_2 \approx dt_{1A}$, the audio heard by user B is A+$Cdt_2$+$k_cCdt_{1A}$. This signal represents voice A audio summed with a slightly voice delayed C signal (e.g., $Cdt_2$) upon which is superimposed an attenuated in-phase version of C (e.g., k=$Cdt_{1A}$). What user B hears is the voice of user A and the voice of user C, conversing naturally in a full duplex manner. In similar fashion, user B hears user A and user C conversing, and user C hears user A and user B conversing.

Figure 3:
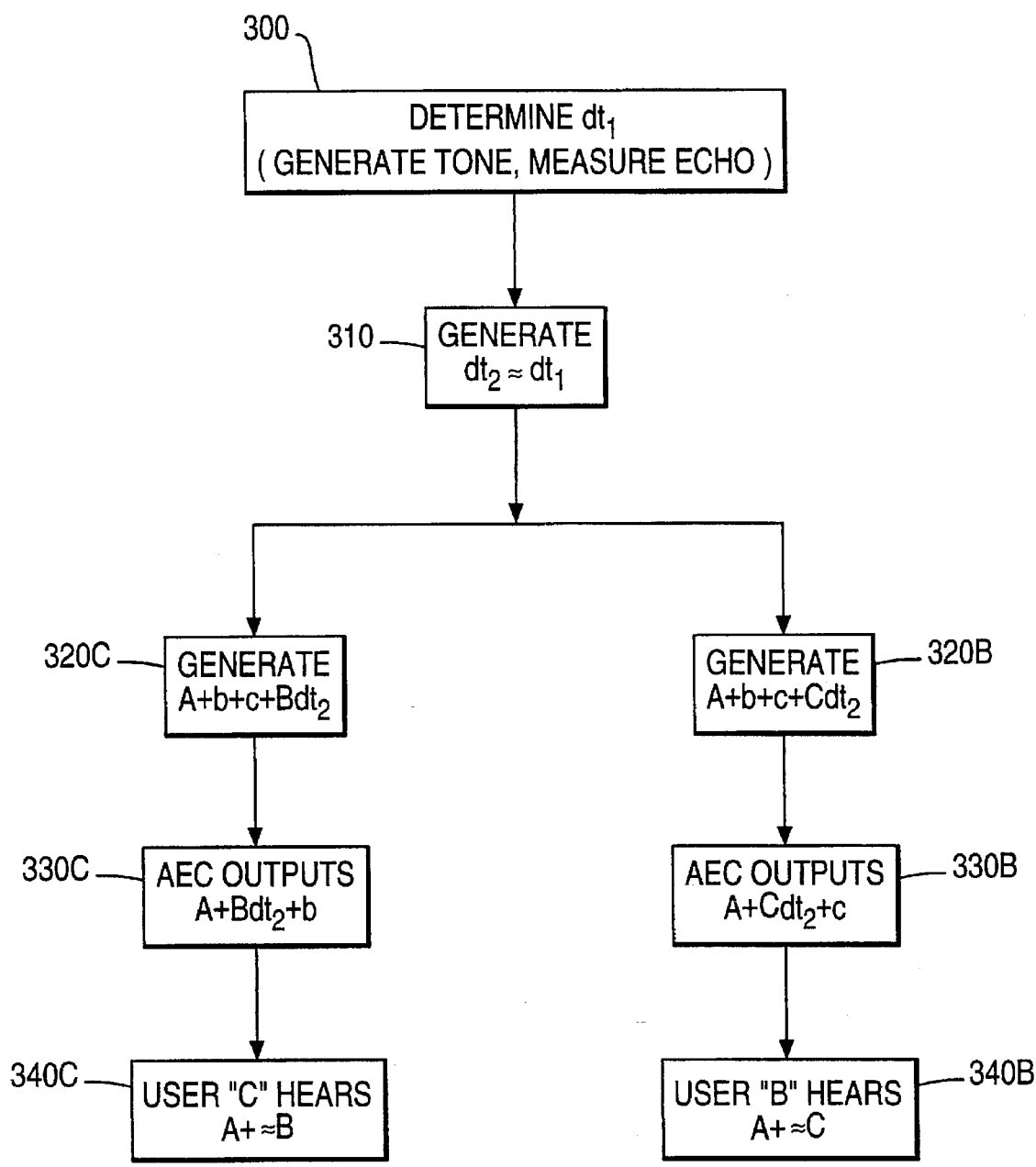
FIG. 3 is a flow diagram of the software-implementation of a bridge function, according to the present invention.

FIG. 3 is a flow chart depicting the procedure of the present invention from the perspective of unit 300A, preferably implemented as a software routine 210 stored in memory 80 and executed by CPU 70 in host computing unit 60.

At step 300, host processor 60 determines unit 300A's acoustic time delay $dt_1$, preferably by generating an audible test tone through speaker 150, whose tone echo is detected by microphone 160, and returned to host processor 60 for comparison with the originally generated test tone. Alternatively, host processor 60 can examine the sound system 140-processed audio from unit 300A's microphone 160. Original audio signals are compared with their acoustic echoes, from which the acoustic delay time dt1 may be calculated.

At step 310, a second delay time $dt2 \approx dt1$ is generated by software routine 210. At steps 320B and 320C, dt2 is used by software 210 to sum and generate respective signals A+b+c+Cdt2 and A+b+c+Bdt2.

At steps 330B and 330C, respective AEC units remove the target unit's own audio, and thus at step 330B the signal A+Cdt2+c is provided, and at step 330C the signal A+Bdt2+b is provided.

At step 340C, user C hears audio A+≈B, and at step 340B, user B hears audio A+≈C.

Of course, if unit 300B is similar in function to unit 300A, its host processor will execute a similar routine to that described above, as well other units that are also similar in function to unit 300A.

Modifications and variations may be made to the disclosed embodiments without departing from the subject and spirit of the invention as defined by the following claims.

What is claimed is:

1. A method for implementing a bridge function in a duplex telephone system that includes at least a first, a second, and a third communication unit, said first unit including a microphone, and a loudspeaker, and being coupleable to said second unit and to said third unit for bilateral transfer of signals therebetween, the method comprising the following steps:

(i) determining an acoustic path time delay $dt_1$ for said first unit representing a time delay between a signal emanating from said loudspeaker and an acoustically delayed version of said signal detected by said microphone and coupled back to said first unit;

(ii) using said $dt_1$ determined in step (i) to generate a substantially equal delay time $dt_2$;

(iii) delaying any originally transmitted signal from a unit other than said first unit by said $dt_2$, and forming a separate summation signal to be sent from said first unit to each other said unit;

each said summation signal comprising audio originally generated by said first unit+an acoustically delayed version of any signal received from any other said unit+a $dt_2$-delayed version of an originally transmitted signal from a said unit to which a said summation signal is not to be coupled;

(iv) removing from each said summation signal formed at step (iii) any delayed signal originally produced by a said communication unit to which said summation signal is to be coupled, to form at least one transmittable signal;

(v) causing said first unit to couple to each other unit a said transmittable signal having substantially no acoustically delayed signal component originally produced by a said unit receiving the said transmittable signal.

2. The method of claim 1, wherein at least said first communication unit includes an acoustic echo cancelling (AEC) unit, and wherein said removing at step (iv) is performed by said AEC unit.

3. The method of claim 1, wherein at step (ii) said $dt_2$ has a magnitude equal to $dt_1 \pm 10$ ms.

4. The method of claim 1, wherein at least one said communication unit includes a unit selected from the group consisting of a speaker telephone, and a personal computer coupled to a telephone.

5. The method of claim 1, wherein at least said first communication unit includes a host computer unit including a central processing unit (CPU) and memory, said CPU executing a routine stored in said memory causing method steps (i), (ii), (iii) and (v) to be performed.

6. The method of claim 5, wherein at step (i), said routine generates a test tone reproduced by said loudspeaker, which tone is acoustically delayed by said first unit's environment, said microphone detecting the acoustically delayed version of said test tone and coupling the same to said host computer unit;

wherein said delay time $dt_1$ is calculated by comparing said test tone with said acoustically delayed version thereof.

7. A software-implemented method for implementing a bridge function in a full duplex telephone system that includes at least a first full duplex communicating unit capable of originating a signal A, a second communicating unit capable of originating a signal B, and a third communicating unit capable of originating a signal C, said first unit being coupleable to said second unit and to said third unit for bilateral transfer of signals therebetween, the method comprising the following steps:

(i) determining an acoustic path time delay $dt_1$ for said first unit representing a time delay between a signal emanating from a loudspeaker coupled to said unit and an acoustically delayed version of said signal detected by a microphone coupled to said first unit;

(ii) using said $dt_1$ determined in step (i) to generate a substantially equal delay time $dt_2$;

(iii) using said signal B present at step (i) to form a version $Bdt_2$ thereof delayed by said delay time $dt_2$, and forming a summation signal $A+b+c+Bdt_2 = A+k_bBdt_1 + k_cCdt_1+Bdt_2$, where at said first unit, b is a said acoustically delayed version of said signal B, and c is a said acoustically delayed version of said signal C;

(iv) using said signal C present at step (i) to form a version $Cdt_2$ thereof delayed by said delay time $dt_2$, and forming a summation signal $A+b+c+Cdt_2 = A+k_bBdt_1 + k_cCdt_1+Cdt_2$;

(v) removing said $b=k_bBdt_1$ from said summation signal $A+k_bBdt_1+k_cCdt_1+Cdt_2$ produced at step (iv) to form an output signal $A+k_cCdt_1+Cdt_2$ that is coupled to said second unit;

(vi) removing said $c=k_cCdt_1$ from said summation signal $A+b+c+Bdt_2$ produced at step (iii) to form an output signal $A+b+Bdt_2$ that is coupled to said third communicating unit;

wherein said second communicating unit hears a signal substantially equal to $A+\approx C$, and wherein said third communicating unit hears a signal substantially equal to $A+\approx B$.

8. The method of claim 7, wherein steps (i) through and including (vi) are carried out within said first communicating unit.

9. The method of claim 7, wherein at least said first communicating unit includes an acoustic echo cancelling (AEC) unit, and wherein said removing at steps (v) and (vi) is performed by said AEC unit.

10. The method of claim 7, wherein at least one said communicating unit includes a unit selected from the group consisting of a speaker telephone, and a personal computer coupled to a telephone.

11. The method of claim 7, wherein at step (ii) said $dt_2$ has a magnitude equal to $dt_1 \pm 10$ ms.

12. The method of claim 7 wherein at least said first communicating unit includes a host computer unit including a central processing unit (CPU) and memory, said CPU executing a routine stored in said memory causing method steps (i), (ii), (iii), and (iv) to be performed.

13. The method of claim 12, wherein:

said first communicating unit includes a loudspeaker that reproduces signals received by said first unit from any other said unit, and a microphone coupling into said first unit any audio present in said first unit's environment;

said routine generates a test tone reproduced by said loudspeaker, which tone is acoustically delayed by said first unit's environment, said microphone detecting the acoustically delayed version of said test tone and coupling the same to said host computer unit; and said delay time $dt_1$ is calculated by comparing said test tone with said acoustically delayed version thereof.

14. A duplex telephone system that includes a soft-ware-implemented bridge function, comprising:

at least a first full duplex communication unit capable of originating a signal A;

a second communication unit capable of originating a signal B; and a third communicator unit capable of originating a signal C;

said first unit being coupleable to said second unit and to said third unit for bilateral transfer of signals therebetween;

wherein at least said first unit includes a host computer having a central processor unit (CPU) and a memory storing a routine implementing at least said bridge function, and further includes a microphone to generate an originally transmitted signal, a loudspeaker to reproduce a signal received from any other said unit, and an acoustic echo cancelling (AEC) unit that prevents another said unit from receiving a signal originally emanating from a said other communication unit;

said CPU executing a portion of said routine to determine an acoustic path time delay $dt_1$ for said first unit, wherein said time $dt_1$ represents a time delay between an originally transmitted and an acoustically delayed version of a same signal;

said CPU executing a portion of said routine to generate a delay dime $dt_2$ that is substantially to equal said $dt_1$;

said CPU executing a portion of said routine to delay any originally transmitted signal from any other said unit by said $dt_2$, and to form for each other said communication unit a summation signal;

wherein each said summation signal comprises audio originally generated by each said communication unit+ said acoustically delayed version of any signal+a $dt_2$-delayed version of an originally transmitted signal from a said communication unit to which said summation signal is not to be coupled;

said AEC unit within said first unit removing from each said summation signal a said acoustically delayed signal originally produced by a said communication unit to which said summation signal is to be coupled, to form a transmittable signal;

said CPU executing a portion of said routine causing said first communication unit to couple to each other said communication unit a said transmittable signal having substantially no acoustically delayed signal component originally produced a said communication unit so coupled.

15. The system of claim 14, wherein for said first unit, said acoustically delayed signal version results from said loudspeaker reproducing a signal from another said communication unit and being detected after a delay time $dt_1$ by said microphone.

16. The system of claim 14, wherein said routine generates a test tone reproduced by said loudspeaker, which tone is acoustically delayed by said first unit's environment, said microphone detecting the acoustically delayed version of said test tone and coupling the same to said host computer unit;

wherein said delay time $dt_1$ is calculated by comparing said test tone with said acoustically delayed version thereof.

17. The system of claim 14, wherein said $dt_2$ has a magnitude equal to $dt_1 \pm 10$ ms.

* * * * *

UNITED STATES PATENT AND TRADEMARK OFFICE
CERTIFICATE OF CORRECTION

PATENT NO. : 5,666,407
DATED : September 9, 1997
INVENTOR(S) : Randy D. Pfeifer

It is certified that error appears in the above-indentified patent and that said Letters Patent is hereby corrected as shown below:

Column 8, line 50, delete "communicator" and insert -- communication --.

Signed and Sealed this

Twenty-third Day of December, 1997

Attest:

BRUCE LEHMAN

Attesting Officer

Commissioner of Patents and Trademarks